United States Patent [19]
Mai et al.

[11] 3,901,828
[45] Aug. 26, 1975

[54] OXIDATION CATALYST FOR COMBUSTIBLES IN GAS MIXTURES

[75] Inventors: Gerhard Mai, Bruchkobel; Reiner Siepmann, Rodenbach; Franz Kummer, Rossdorf, all of Germany

[73] Assignee: W. C. Heraeus GmbH, Hanau, Germany

[22] Filed: Sept. 7, 1973

[21] Appl. No.: 395,089

Related U.S. Application Data

[63] Continuation-in-part of Ser. No. 294,705, Oct. 3, 1972, abandoned, which is a continuation-in-part of Ser. No. 295,790, Oct. 6, 1972, abandoned, which is a continuation-in-part of Ser. No. 284,323, Aug. 28, 1972, abandoned.

[30] Foreign Application Priority Data

Nov. 8, 1971  Germany............................ 2155338

[52] U.S. Cl................ 252/462; 252/470; 252/471; 252/472; 423/213.2; 423/213.5
[51] Int. Cl.²............................................ B01J 23/10
[58] Field of Search........... 252/462, 470, 471, 472; 423/213.2, 213.5

[56] References Cited
UNITED STATES PATENTS

| | | | |
|---|---|---|---|
| 3,331,787 | 7/1967 | Keith et al. | 252/477 R |
| 3,595,809 | 7/1971 | Kehl | 252/462 |
| 3,644,147 | 2/1972 | Young | 136/86 D |
| 3,780,126 | 12/1973 | Manning | 252/471 X |

FOREIGN PATENTS OR APPLICATIONS

| | | | |
|---|---|---|---|
| 2,119,702 | 11/1971 | Germany | 252/462 |

*Primary Examiner*—W. J. Shine
*Attorney, Agent, or Firm*—Burgess, Dinklage & Sprung

[57] ABSTRACT

A catalyst for the oxidation of combustible components in gas mixtures such as carbon monoxide and/or gaseous organic substances in automobile exhausts has the formula $$(A_1)_m(A_2)_n(B_1)_p(B_2)_q O_3$$

wherein $m$ and $n$ have values from 0 to 1, and $p$ and $q$ have values greater than 0 but less than 1, and $m + n = 1$ and $p + q = 1$;

$A_1$ is at least one trivalent cation of metals selected from the group of the rare earth metals;

$A_2$ is at least one divalent cation of metals selected from the group of Sr, Ba and Pb;

$B_1$ is at least one divalent cation of metals selected from the group of Ni, Co, Fe, Zn, Cu, and Mn;

$B_2$ is at least one selected from the group of at least one tetravalent cation of metals from the group of Ru, Os, Ir, Pt, Ti, Mo, W, Nb, and Mn, and V, and at least one pentavalent cation of metals from the group of Ta, Sb and Nb; with the proviso that $(m \cdot a_1) + (n \cdot a_2) + (p \cdot b_1) + (q \cdot b_2) = 6$ such that a neutrality of charge exists, wherein $a_1$ = the valency of $A_1$
$a_2$ = the valency of $A_2$
$b_1$ = the valency of $B_1$
$b_2$ = the valency of $B_2$

11 Claims, 2 Drawing Figures

OXIDATION CATALYST FOR COMBUSTIBLES IN GAS MIXTURES

RELATED APPLICATION

This application is a continuation-in-part of copending application Ser. No. 294,705 filed Oct. 3, 1972, now abandoned, and is related to copending application Ser. No. 395,090 filed Sept. 7, 1973 which is in turn a continuation-in-part of application Ser. No. 295,790 filed Oct. 6, 1972, now abandoned, which is in turn a continuation-in-part of application Ser. No. 284,323, filed Aug. 28, 1972, now abandoned.

BACKGROUND

This invention relates to a catalyst for the oxidation of combustible gaseous components of gas mixtures, especially carbon monoxide and/or gaseous organic substances in automobile exhaust gases.

Exhaust gases from internal combustion engines and of industrial exhausts contain carbon monoxide and gaseous organic substances as combustible components. Carbon monoxide is especially dangerous because it is an odorless gas occuring in high concentration in Otto-cycle engine exhausts, for example, and is very toxic. Organic substances are sometimes malodorous (e.g., aldehydes), and sometimes toxic, and may result in eventual damage to the health (e.g., the carcinogenous benzpyrene) and together with nitrogen oxides may lead to the formation of smog. For this reason efforts are being made to diminish the concentration of these harmful gaseous components in exhaust gases to improve and restore the quality of our environment.

One means to this end is to modify the process that produces the harmful components so that their concentration will be kept low from the start. Experiments have been conducted at great expense for this purpose in the field of internal combustion engines, for example. Costly control systems have been the result, but the desired low maximum concentrations have not been achieved.

A more effective means for the destruction of the combustible gaseous components is catalytic afterburning. For this purpose exhaust gases, together with an amount of oxygen that is at least sufficient for complete oxidation, are passed through a catalyst and the carbon compounds are oxidized to harmless carbon dioxide and water.

Catalyst known for this purpose are made of a heat-resistant support to which a noble metal is applied, especially platinum, although catalysts using oxides of copper, chromium, manganese, iron, cobalt or nickel have also been proposed.

In catalytic afterburning, the catalyst or the exhaust gas must be heated to a certain ignition temperature to enable oxidation to take place. However, the catalyst is often heated by the combustion heat and/or by excessively high exhaust temperatures to temperatures high above the ignition temperature, and this can lead to its deactivation. Furthermore, catalyst poisons, such as chlorine, sulfur, phosphorus and lead compounds, some originating from petroleum and others from fuel additives or other additives, occur in exhaust gases, and even in very low concentrations they usually impair the effectiveness of the catalyst.

SUMMARY

The object of this invention is a catalyst for the oxidation of combustible gaseous components of gas mixtures, especially of carbon monoxide and/or gaseous organic substances in automobile exhausts, which will have a high activity and will retain this activity under actual operating conditions. It is furthermore highly insensitive to catalyst poisons.

Thus the invention provides a catalyst composition of the formula:

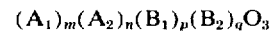

$$(A_1)_m(A_2)_n(B_1)_p(B_2)_q O_3$$

wherein $m$ and $n$ have values from 0 to 1, and $p$ and $q$ have values greater than 0 but less than 1, and $m + n = 1$ and $p + q = 1$;

$A_1$ is at least one trivalent cation of metals selected from the group of the rare earth metals;

$A_2$ is at least one divalent cation of metals selected from the group of Sr, Ba and Pb;

$B_1$ is at least one divalent cation of metals selected from the group of Ni, Co, Fe, Zn, Cu, and Mn;

$B_2$ is at least one selected from the group of at least one tetravalent cation of metals from the group of Ru, Os, Ir, Pt, Ti, Mo, W, Nb, and Mn, and V, and at least one pentavalent cation of metals from the group of Ta, Sb and Nb;

with the proviso that $(m \cdot a_1) + (n \cdot a_2) + (p \cdot b_1) + (q \cdot b_2) = 6$ such that a neutrality of charge exists, wherein $a_1$ = the valency of $A_1$ $a_2$ = the valency of $A_2$ $b_1$ = the valency of $B_1$ $b_2$ = the valency of $B_2$

DESCRIPTION OF THE DRAWING

The present invention will be more fully understood from the following description taken in conjunction with the accompanying drawing wherein.

DESCRIPTION

Figure 1:
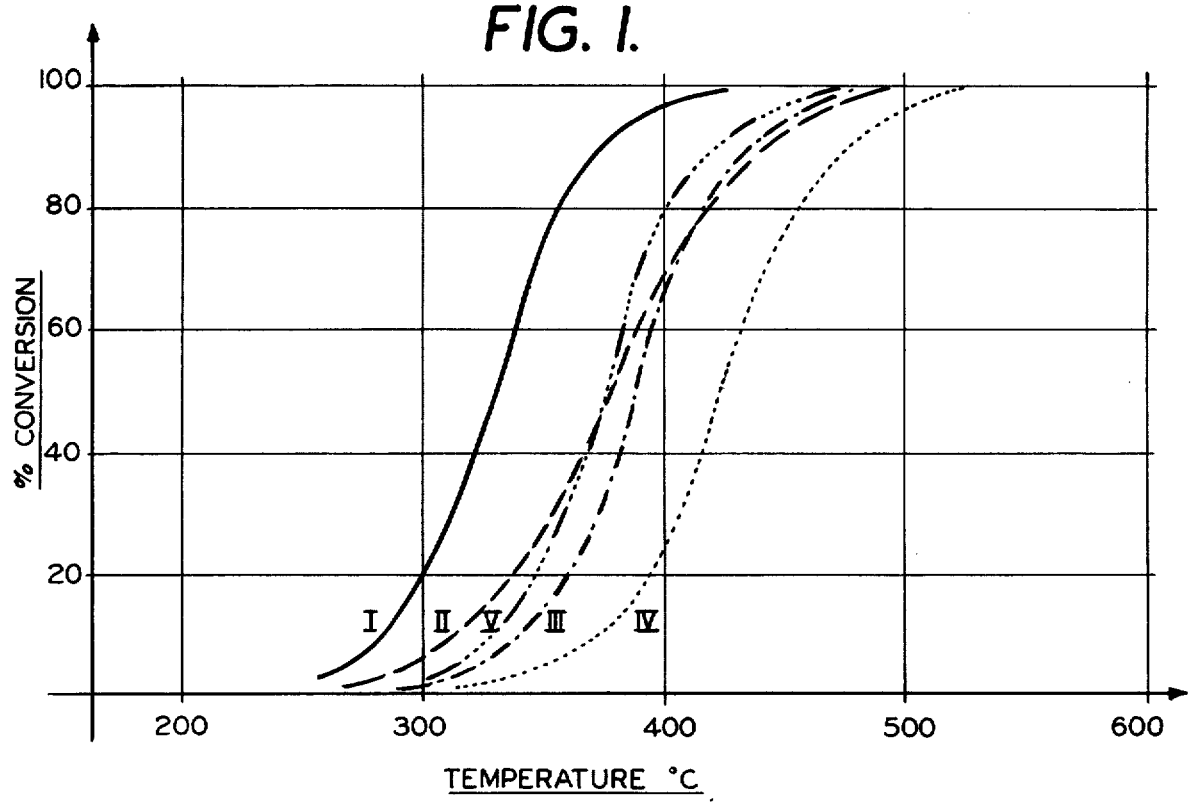
FIGS. 1 and 2 are graphs illustrating and comparing test data described in the examples.

The catalysts of the invention may be used as solid catalyst (bodies consisting of catalyst, uniformly mixed, if desired, with ceramic binding agent) or in conjunction with a supporting material, preferably a glass ceramic (cf. U.S. Pat. Nos. 2,998,675 and 3,275,493) or ceramic substance, such as for example $\alpha$-$Al_2O_3$, to the surface of which the catalyst is applied. The shape of the support material may be as desired. Preferably, however, the support is in honeycomb tube or pellet form. Also, a mixture of the catalyst with a binding agent may be applied to this support.

The catalysts of the invention are especially highly active. Surprisingly, they have proven insensitive to catalyst poisons. Therefore they are especially suited to the oxidation of combustible gaseous components in exhaust gases of internal combustion engines, especially those using leaded fuel and fuel containing common additives.

The catalysts of the invention may contain noble metals, but the noble metal may also be replaced wholly or partially by the above-named base metal components. Even then, they will deliver the performance required of them and have the same advantages as noble-metal catalysts.

Very good oxidation results have been achieved with a catalyst of the following composition:

$LaCo_{1/6}Fe_{1/6}Ni_{1/6}Ru_{1/2}O_3$ which is prepared according to Example 1 herein. On the basis of X-ray examination, this composition has a perovskite structure.

In many oxides of the formula $ABO_3$, wherein A signifies metal ions and B metal ions different from A, the perovskite structure occurs (cf. U.S. Pat. No. 3,595,809). The cations A and B are of different size. One of the cations is much smaller than the others. The cation A does not have to be a cation of only one metal but can be composed of cations of various metals ($A_1 + A_2 + A_3 + \ldots + A_n$), whereby all of these cations must have approximately the same ion radius. The same applies to the B cation. For example, an oxide with perowskite structure can have the formula:

$$(A_1 + A_2)(B_1 + B_2 + B_3)O_3.$$

The charges of the cations can vary but the total charge must amount to + 6.

In tests of catalytic activity there was observed a relationship between the structural characteristics of these "mixed oxides" and their catalytic activity. Especially catalytically active are "mixed oxides" having a perovskite structure.

Generally these "mixed oxides" are prepared by reacting suitable starting compounds in stoichiometric amounts necessary to form the emperical formula $$(A_1)_m (A_2)_n (B_1)_p (B_2)_q O_3$$

Thus, aqueous solutions, containing the cations $A_1$, $A_2$, $B_1$ and $B_2$ in the form of their nitrates, were evaporated to dryness and the obtained residue was heated to incandescence at 700°C for 4 hours.

From a number of "mixed oxides" produced, X-ray powder diagrams were made for determining their structure. The obtained diagrams clearly show the reflexes of a perovskite phase. It was not possible to detect oxides of the individual elements roentgenographically. It was concluded from this that the cations present in the starting compounds used had reacted with one another by forming a composition with perovskite structure which could therefore be assigned an emperical formula, for example $$LaCo_{1/6}Fe_{1/6}Ni_{1/6}Ru_{1/2}O_3.$$

Catalysts prepared in the examples were tested roentgenographically. Taking the numerous self-interferences of the cordierite used in the example herein into consideration, it was possible to identify the strongest reflexes of the perovskite phase which do not coincide with the reflexes of the carrier material. The band separations $d$ [A] for the catalytically active composition of the carrier catalysts described in the examples 1, 2, 6 and 9 were as follows:

| Catalytically active composition: | Band Separations d [A]: | | | |
|---|---|---|---|---|
| 1. $LaFe_{1/6}Co_{1/6}Ni_{1/2}Ru_{1/2}O_3$ | 2.79 | 2.28 | 1.96₉ | 1.60₈ |
| 2. $LaFe_{1/6}Ni_{1/6}Co_{1/6}Ru_{1/6}Ti_{1/3}O_3$ | 2.78 | 2.27 | 1.96₅ | 1.60₅ |
| 9. $LaNi_{1/2}Mo_{1/2}O_3$ | 2.77 | | 1.96₁ | 1.59₆ |

The manufacture and use of a catalyst of the invention on a honeycomb tube support are described in the following examples which are illustrative but otherwise non-limiting.

EXAMPLE 1

4.45 g of lanthanum, 0.3135 g of nickel, 0.3149 g of cobalt, 0.2985 g of iron and 1.619 g of ruthenium, each in the form of nitrates, are dissolved in 600 ml of water. A honeycomb cordierite tube volume of 2 liters is impregnated with this solution. After drying at 120°C, the impregnated honeycomb tube is subjected to heat treatment of 600°C in air. The honeycomb tube thus obtained contains, among other substances, 0.1 percent ruthenium with reference to its total weight.

The effectiveness of this catalyst for the oxidation of propane is shown by Curve I (solid line) in FIG. 1. This curve reflects the percentage transformation of a propane-air mixture which was passed through the catalyst at the stated temperature. Oxidation starts at 270°C and is complete beginning at 400°C. Since propane is one of the most difficult substances to oxidize in auto exhausts, the beginning of CO transformation was also determined, and it was found to be at 200°C.

To study the effect of various catalyst poisons, the activity of the described catalyst was tested after treatment with lead, chlorine, sulfur and phosphorus compounds. The catalyst was treated with solutions of lead acetate, ammonium chloride, sulfuric acid and phosphoric acid, respectively, at 100°C, and then heated to 600°C. The amounts of poison applied correspond to those which are produced on the catalyst over a road distance of 20,000 km 1/6ordinary fuel. The effectiveness of the poisoned catalysts was tested with a propane-air mixture under the same conditions as the unpoisoned catalysts. The transformation curves are represented in FIG. 1. Curve II (broken line) applies to the catalyst treated with lead, curve III (line of dashes separated by single dots) to the catalyst treated with chlorine, curve IV (dotted line) to the catalyst treated with sulfur and curve V (dashes separated by dotted lines) to the catalyst treated with phosphorus. In each case complete transformation takes place at temperatures between 430° and 520°C.

EXAMPLE 2

4.45 g of lanthanum, 0.3135 g of nickel, 0.3149 g of cobalt, 0.2985 g of iron, 0.539 g of ruthenium, each in the form of nitrates, and 0.511 g of titanium used as titanium (III) in the form of titanium (III)-chloride, are dissolved in 600 ml of water. By the addition of $H_2O_2$ titanium (III) is oxidized to titanium (IV). A honeycomb tube volume of 2 liters is impregnated with the obtained solution. After drying at 120°C, the impregnated honeycomb tube is subjected to heat treatment at 600°C in air. The composition applied onto the honeycomb tube corresponds to the formula:

$$LaFe_{1/6}Ni_{1/6}Co_{1/6}Ru_{1/6}Ti_{1/3}O_3.$$

Its catalytical activity is also very good. The effectiveness for the propane-oxidation is evident from Curve I (represented by a solid line) in FIG. 2. The propane-oxidation starts at 300°C and becomes complete from 450°C up.

EXAMPLE 3

4.45 g of lanthanum, 0.3135 g of nickel, 0.3149 g of cobalt, 0.2985 g of iron and 0.815 g of vanadium, each in the form of nitrates, are dissolved in 600 ml of water. A honeycomb tube volume of 2 liters is impregnated with the obtained solution. After drying at 120°C, the impregnated honeycomb tube is subjected to a heat treatment at 600°C in air. The composition applied onto the honeycomb tube corresponds to the formula:

$$LaFe_{1/6}Ni_{1/6}Co_{1/6}V_{1/2}O_3.$$

Figure 2:
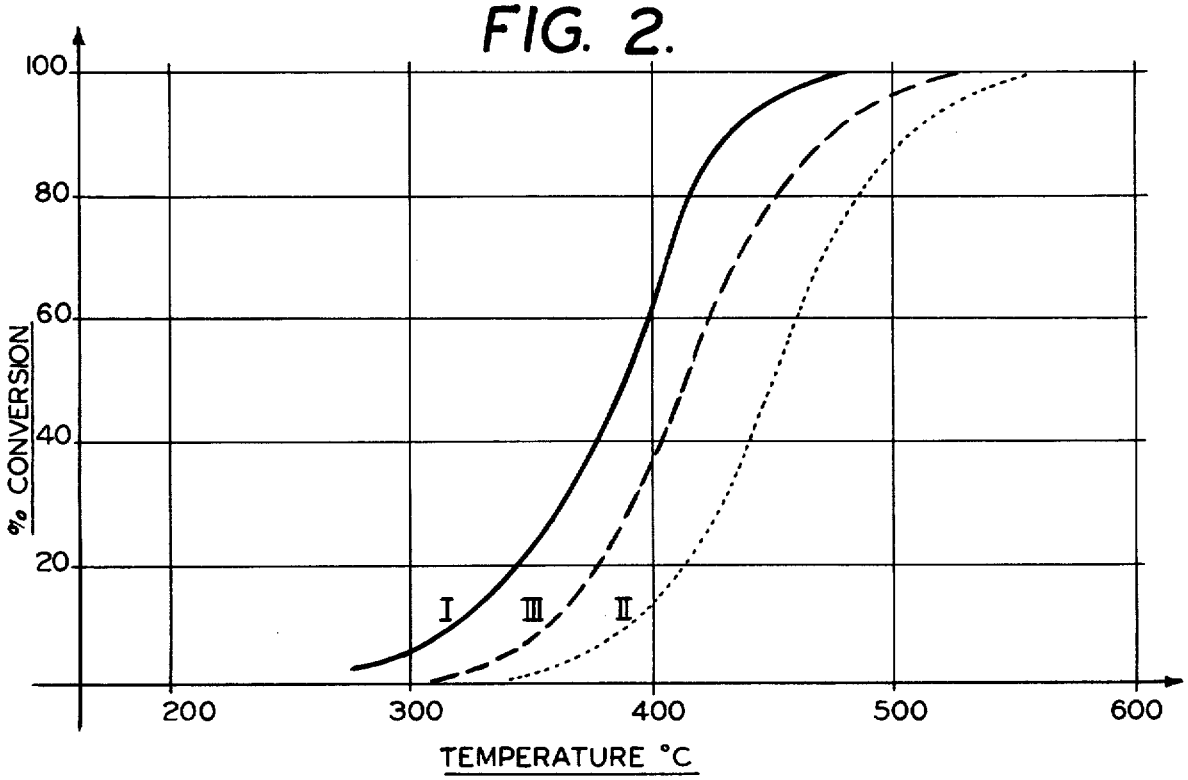

The propane oxidation in the presence of this catalytically active composition, represented as curve II (dotted line) in FIG. 2, starts at 350°C and becomes complete from 520°C up.

EXAMPLE 4

4.45 g of lanthanum, 1.04 g of copper and 0.881 g of manganese, each in the form of the nitrates, are dissolved in 600 ml of water. A honeycomb tube volume of 2 liters is impregnated with the obtained solution. After drying at 120°C, the impregnated honeycomb tube is subjected to a heat treatment at 600°C in air. The composition applied onto the honeycomb tube corresponds to the formula $$LaCu_{1/2}Mn_{1/2}O_3$$

and is also very active for the propane oxidation. In accordance with Curve III (broken line) in FIG. 2, the reaction starts at 320°C and is completed at 500°C.

In addition to the compositions set forth in the Examples 1 to 4, also those catalysts have proven to be good whose preparation is described in the following examples:

EXAMPLE 5

4.45 g of lanthanum, 0.2985 g of iron, 0.3135 g of nickel, 0.3149 g of cobalt, each used in the form of the nitrates, and 0.766 g of titanium, used as titanium(III)-chloride, are dissolved in 600 ml of water. $H_2O_2$ is used for the oxidation of titanium (III) to titanium(IV). A honeycomb tube volume of 2 liters is impregnated with the obtained solution. After drying at 120°C, the impregnated honeycomb tube is subjected to a heat treatment at 600°C in air. The composition applied onto the honeycomb tube corresponds to the formula $$LaFe_{1/6}Ni_{1/6}Co_{1/6}Ti_{1/2}O_3.$$

EXAMPLE 6

4.45 g of lanthanum, 0.945 g of cobalt, 0.81 g of ruthenium and 1.56 g of platinum, each used in the form of the nitrates, are dissolved in 600 ml of water. A honeycomb tube volume of 2 liters is impregnated with the obtained solution. After drying at 120°C, the impregnated honeycomb tube is subjected to a heat treatment at 600°C in air. The composition applied onto the honeycomb tube corresponds to the formula $$LaCo_{1/2}Ru_{1/4}Pt_{1/4}O_3.$$

EXAMPLE 7

1.536 g of molybdenum are dissolved as ammonium molybdate in aqueous ammonia solution. After neutralization with nitric acid, 4.45 g of lanthanum and 0.94 g of nickel in the form of the nitrates dissolved in water are added. A honeycomb tube volume of 2 liters is impregnated with the obtained solution filled with water to 600 ml. After drying at 120°C, the impregnated honeycomb tube is subjected to a heat treatment at 600°C in air. The composition applied onto the honeycomb tube corresponds to the formula $$LaNi_{1/2}Mo_{1/2}O_3.$$

Advantageous results have shown also with catalysts according to the invention having the composition $$(A_1)_m(A_2)_n(B_1)_p(B_2)_qO_3$$

with $m$ and $n$ greater than 0. In the following example the preparation of such a composition is described:

EXAMPLE 8

4.45 g of lanthanum, 2.21 g of barium, 0.94 g of nickel and 1.76 g of manganese, each used in the form of the nitrates, are dissolved in 600 ml of water. A honeycomb tube volume of 2 liters is impregnated with the obtained solution. After drying at 120°C, the impregnated honeycomb tube is subjected to a heat treatment at 600°C in air. The composition applied onto the honeycomb tube corresponds to the formula $$La_{2/3}Ba_{1/3}Ni_{1/3}Mn_{2/3}O_3.$$

In the following examples the manufacture of some solid catalysts is described.

EXAMPLE 9

Following the general procedures of Example 1 a catalyst having the formula $$Nd_{1/3}Sr_{2/3}MnO_3$$

can be prepared from a solution of 6,61 g of $Nd(NO_3)_3$, 11,35 g of $Sr(NO_3)_2.4H_2O$ and 11,88 g of $MnCl_2.4H_2O$ in 100 ml of water. This solution was evaporated to dryness at 150°C and the obtained residue was heated in air at 600°C for 4 hours to provide a catalyst of the afore mentioned formula.

EXAMPLE 10

Following the general procedures of Example 1 a catalyst having the formula $$Nd_{1/2}Sr_{1/2}Mn_{1/4}Nb_{3/4}O_3$$

can be prepared from a solution of 9,91 g of $Nd(NO_3)_3$, 8,51 g of $Sr(NO_3)_2.4H_2O$, 2,97 g of $MnCl_2.4H_2O$ and 12,17 g of $NbCl_5$ in 100 ml of water, containing concentrated hydrochloric acid in an amount sufficient to prevent hydrolysis of the $NbCl_5$. This solution was evaporated to dryness at 150°C and the obtained residue was heated in air at 600°C for 4 hours to provide a catalyst of the afore mentioned formula.

EXAMPLE 11

Following the general procedures of Example 1 a catalyst having the formula $$Nd_{1/4}Sr_{3/4}Mn_{5/12}Nb_{7/12}O_3$$

can be prepared from a solution of 4,45 g of $Nd(NO_3)_3$, 12,77 g of $Sr(NO_3)_2.4H_2O$, 4,95 g of $MnCl_2.4H_2O$ and 9,46 g of $NbCl_5$ in 100 ml of water, containing concentrated hydrochloric acid in an amount sufficient to prevent hydrolysis of the $NbCl_5$. This solution was evaporated to dryness at 150°C and the obtained residue was heated in air at 600°C for 4 hours to provide a catalyst of the afore mentioned formula.

EXAMPLE 12

Following the general procedures of Example 1 a catalyst having the formula $$Nd_{1/3}Pb_{2/3}MnO_3$$

can be prepared from a solution of 6,61 g of $Nd(NO_3)_3$, 15,19 g of $Pb(NO_3)_2$, 11,88 g of $MnCl_2 \cdot 4H_2O$ and 4 g of tartaric acid in 100 ml of water. This solution was evaporated to dryness at 150°C and the obtained residue was heated in air at 600°C for 4 hours to provide a catalyst of the afore mentioned formula.

EXAMPLE 13

Following the general procedures of Example 1 a catalyst having the formula $$Nd_{1/2}Pb_{1/2}Mn_{1/4}Nb_{3/4}O_3$$

can be prepared from a solution of 9,91 g of $Nd(NO_3)_3$, 9,24 g of $Pb(NO_3)_2$, 2,97 g of $MnCl_2 \cdot 4H_2O$, 12,17 g of $NbCl_5$ and 3 g of tartaric acid in 100 ml of water, containing concentrated hydrochlorid acid in an amount sufficient to prevent hydrolysis of the $NbCl_5$. This solution was evaporated to dryness at 150°C and the obtained residue was heated in air at 600°C for 4 hours to provide a catalyst of the afore mentioned formula.

EXAMPLE 14

Following the general procedures of Example 1 a catalyst having the formula $$Nd_{1/4}Pb_{3/4}Mn_{5/12}Nb_{7/12}O_3$$

can be prepared from a solution of 4,45 g of $Nd(NO_3)_3$, 17,08 g of $Pb(NO_3)_2$, 4,95 g of $MnCl_2 \cdot 4H_2O$, 9,46 g of $NbCl_5$ and 4,5 g of tartaric acid in 100 ml of water containing concentrated hydrochloric acid in an amount sufficient to prevent hydrolysis of the $NbCl_5$. This solution was evaporated to dryness at 150°C and the obtained residue was heated in air at 600°C for 4 hours to provide a catalyst of the afore mentioned formula.

What is claimed is:

1. Catalyst composition for the oxidation of combustible gaseous components of gas mixtures of carbon monoxide or gaseous organic substances or mixtures of carbon monoxide and gaseous organic substances in automotive exhausts comprising the formula:

$$(A_1)_m (B_1)_p (B_2)_q O_3$$

wherein $m$ is 1, and $p$ and $q$, respectively, have values greater than 0 but less than 1, and $p + q = 1$; and $A_1$ is at least one trivalent cation of metals selected from the group consisting of the rare earth metals;

$B_1$ is at least one divalent cation of metals selected from the group consisting of Ni, Co, Fe and Cu;

$B_2$ is at least one tetravalent cation of metals selected from the group consisting of Ru, Os, Ir, Pt, Ti, Mo, Mn and V; with the proviso that when $B_1$ is Cu, $B_2$ is only Mn, and the further proviso that $(m \cdot a_1) + (p \cdot b_1) + (q \cdot b_2)$ equals 6 such that a neutrality of charge exists, wherein $a_1 =$ the valency of $A_1$ $b_1 =$ the valency of $B_1$ and $b_2 =$ the valency of $B_2$.

2. Catalyst of claim 1 having the composition $$LaCo_{1/6}Fe_{1/6}Ni_{1/6}Ru_{1/2}O_3.$$

3. Catalyst of claim 1 having the composition $$LaFe_{1/6}Ni_{1/6}Co_{1/6}Ru_{1/6}Ti_{1/3}O_3.$$

4. Catalyst of claim 1 having the composition $$LaFe_{1/6}Ni_{1/6}Co_{1/6}V_{1/2}O_3.$$

5. Catalyst of claim 1 having the composition $$LaCu_{1/2}Mn_{1/2}O_3.$$

6. Catalyst of claim 1 having the composition $$LaFe_{1/6}Ni_{1/6}Co_{1/6}Ti_{1/2}O_3.$$

7. Catalyst of claim 1 having the composition $$LaCo_{1/2}Ru_{1/4}Pt_{1/4}O_3.$$

8. Catalyst of claim 1 having the composition $$LaNi_{1/2}Mo_{1/2}O_3.$$

9. Catalyst of claim 1 applied to a support.

10. Catalyst of claim 9 wherein the support has a honeycomb-tube structure.

11. Catalyst of claim 1 uniformly mixed with a ceramic binding agent.

* * * * *

UNITED STATES PATENT OFFICE
CERTIFICATE OF CORRECTION

Patent No. 3,901,828          Dated August 26, 1975

Inventor(s) Gerhard Mai et al.

It is certified that error appears in the above-identified patent and that said Letters Patent are hereby corrected as shown below:

Column 4, line 34, before "ordinary" delete "1/6" and insert -- using --.

Signed and Sealed this sixth Day of January 1976

[SEAL]

Attest:

RUTH C. MASON
*Attesting Officer*

C. MARSHALL DANN
*Commissioner of Patents and Trademarks*